United States Patent
Pai et al.

(10) Patent No.: US 8,712,149 B2
(45) Date of Patent: Apr. 29, 2014

(54) APPARATUS AND METHOD FOR FOREGROUND DETECTION

(75) Inventors: Hung-I Pai, New Taipei (TW); Yi-Ta Wu, New Taipei (TW); Kung-Ming Lan, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 43 days.

(21) Appl. No.: 13/612,845

(22) Filed: Sep. 13, 2012

(65) Prior Publication Data

US 2013/0136350 A1    May 30, 2013

(30) Foreign Application Priority Data

Nov. 28, 2011 (TW) .............................. 100143591 A

(51) Int. Cl.
*G06K 9/00* (2006.01)
(52) U.S. Cl.
USPC .......................................................... 382/165
(58) Field of Classification Search
USPC ........................ 382/103, 164, 165, 173, 260
See application file for complete search history.

(56) References Cited

U.S. PATENT DOCUMENTS

| 7,085,401 | B2 * | 8/2006 | Averbuch et al. ............. 382/103 |
| 7,277,580 | B2 | 10/2007 | Xu |
| 7,899,248 | B2 | 3/2011 | Liu |
| 8,542,873 | B2 * | 9/2013 | Lien et al. ..................... 382/103 |
| 2012/0106837 | A1 * | 5/2012 | Partis et al. .................... 382/165 |

OTHER PUBLICATIONS

Carmona et al., "A new video segmentation method of moving objects based on blob-level knowledge," Pattern Recognition Letters 29, 2008, pp. 272-285.
Stauffer et al., "Adaptive background mixture models for real-time tracking," IEEE Computer Society Conference on Computer Vision and Pattern Recognition 2, 1999, pp. 1-7.

* cited by examiner

*Primary Examiner* — Phuoc Tran
(74) *Attorney, Agent, or Firm* — Jianq Chyun IP Office

(57) ABSTRACT

An apparatus and a method for fast foreground detection are provided. A foreground characteristic value calculation module calculates a foreground characteristic value by using an image intensity of each pixel in a target image and a background intensity of a corresponding pixel in a background model. A first filter determines a first threshold and a second threshold according to at least one scenic factor for capturing the target image and filters out non-foreground pixels having their foreground characteristic value between the first threshold and the second threshold from pixels in the target image. A second filter determines an image difference condition and a chroma similarity condition according to the scenic factor and filters out non-foreground pixels having their foreground characteristic value satisfying the image difference condition and the chroma similarity condition from pixels left by the first filter. Pixels left by the second filter are served as foreground pixels.

13 Claims, 6 Drawing Sheets

APPARATUS AND METHOD FOR FOREGROUND DETECTION

CROSS-REFERENCE TO RELATED APPLICATION

This application claims the priority benefit of Taiwan application serial no. 100143591, filed on Nov. 28, 2011. The entirety of the above-mentioned patent application is hereby incorporated by reference herein and made a part of specification.

TECHNICAL FIELD

The disclosure relates to an apparatus and a method for detecting foregrounds in surveillance images.

BACKGROUND

Video surveillance is broadly applied in our daily life. When thousands of video cameras are deployed at every corner of a city and send captured images back to back-end control stations, image management and recognition becomes an arduous back-end task. Besides accomplishing the security purpose through manual monitoring, video surveillance may also be realized through intelligent video object detection. The stability of such a function directly affects the willingness of consumers to the acceptance of intelligent video cameras.

One of factors in the stability of intelligent video object detection is fast and accurate foreground detection. In a surveillance application, a foreground usually refers to a person, vehicle, or any other moving object on the scene. Accurate foreground detection can be applied in various surveillance applications, such as human tracking, human counting, and intrusion detection of virtual caution zone. Without a good foreground detection technique, aforementioned applications won't be able to provide satisfactory or commercializable result. Thus, accurate foreground detection is one of the most critical techniques.

In general foreground separation techniques, an image intensity background model is first established, and the foreground is then separated according to the difference between the foreground and the background. The most commonly adopted technique is to establish a background intensity Gaussian model for each pixel. In recent years, a technique of separating foreground by manually setting thresholds of intensity and color vector difference $\theta$ is provided. Compared to a technique in which the foreground is separated based on intensity difference, this technique provides a more accurate result since one more factor is taken into consideration. However, because the color vector difference $\theta$ is further calculated regarding each pixel besides the intensity of the pixel, the operation load is greatly increased. As a result, the implementation on an embedded platform is made very complicated.

High accuracy results in high operation load, and high operation load requires high-priced processor, which is concerned to a commercial product because the cost of the product will be increased. In some cases, even the high level processor cannot accomplish the high operation load brought by the complicated calculation algorithm.

SUMMARY

An apparatus and a method for foreground detection are introduced herein, in which foreground pixel filters are adjusted according to the context so that foreground detection with high accuracy and low operation load is realized.

The disclosure provides a foreground detection apparatus including a foreground characteristic value calculation module, a first filter, and a second filter. The foreground characteristic value calculation module calculates a foreground characteristic value by using an image intensity of each of a plurality of pixels in a target image and a background intensity of a corresponding pixel in a background model. The first filter determines a first threshold and a second threshold according to at least one scenic factor for capturing the target image and filters out a plurality of non-foreground pixels having a corresponding foreground characteristic value between the first threshold and the second threshold from the pixels in the target image. The second filter determines an image difference condition and a chroma similarity condition according to the scenic factor for capturing the target image, filters out non-foreground pixels having the corresponding foreground characteristic value satisfying the image difference condition and the chroma similarity condition from the pixels left by the first filter, and serves the remaining pixels as a plurality of foreground pixels.

The disclosure provides a foreground detection method adapted to an electronic apparatus for detecting a plurality of foreground pixels in a target image. In the foreground detection method, a foreground characteristic value is calculated by using an image intensity of each of a plurality of pixels in a target image and a background intensity of a corresponding pixel in a background model. Then, a first threshold and a second threshold are determined according to at least one scenic factor for capturing the target image, and a plurality of non-foreground pixels having the corresponding foreground characteristic value between the first threshold and the second threshold is filtered out from the pixels in the target image. Next, an image difference condition and a chroma similarity condition are determined according to the scenic factor for capturing the target image, and non-foreground pixels having the corresponding foreground characteristic value satisfying the image difference condition and the chroma similarity condition are filtered out from a plurality of pixels left by the first filter. The remaining pixels are served as a plurality of foreground pixels.

As described above, the disclosure provides an apparatus and a method for foreground detection, in which most non-foreground pixels are first filtered out, and the rest non-foreground pixels are then filtered out respectively according to image intensity difference and chroma similarity, so that foreground pixels in a surveillance image can be quickly and accurately detected.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
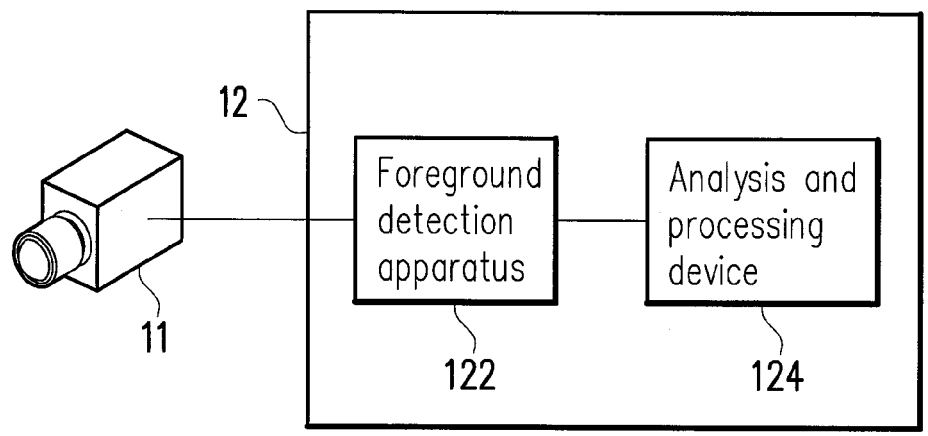
FIG. 1 is a diagram of a surveillance system according to an exemplary embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

If nobody appears in a scene under surveillance most of the time, the images captured by a surveillance video camera usually contain the background. In this case, the foreground detected by the surveillance system is very close to the background. Based on this characteristic, the disclosure provides a pre-filter for roughly filtering out the similar parts of the foreground and the background in a surveillance image before foreground detection is performed, such that the operation load, and accordingly the hardware cost, of a surveillance system for foreground detection can be greatly reduced.

FIG. 1 is a diagram of a surveillance system according to an exemplary embodiment of the disclosure. Referring to FIG. 1, the surveillance system in the present exemplary embodiment includes a surveillance video camera 11 and a surveillance host 12. The surveillance video camera 11 may be a video camera deployed in a scene under surveillance. The surveillance video camera 11 captures surveillance images and sends these images to the surveillance host 12 through a network or any other wired or wireless technique. The surveillance host 12 displays and analyzes these surveillance images. The surveillance host 12 is an operational electronic device, such as a personal computer (PC) or a setup box. The surveillance host 12 includes a foreground detection apparatus 122 and an analysis and processing device 124 which supports various advanced image processing functions. When the surveillance host 12 executes a surveillance function, the foreground detection apparatus 122 first performs foreground detection on a target image input by the surveillance video camera 11 and provides the detected foreground information to the analysis and processing device 124, and the analysis and processing device 124 then performs subsequent image processing, analysis, and warning functions.

Figure 2:
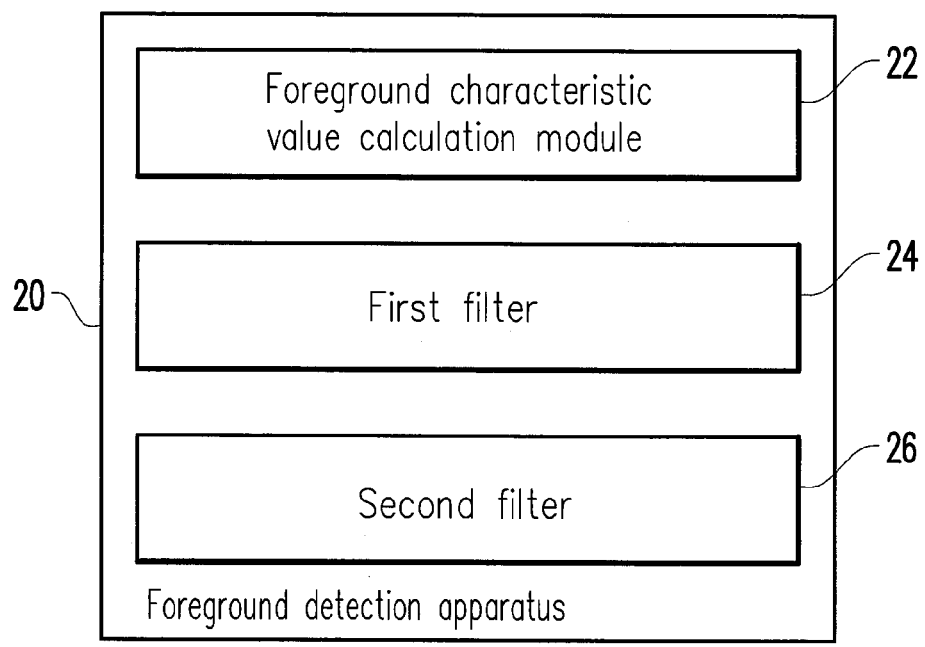
FIG. 2 is a block diagram of a foreground detection apparatus according to an exemplary embodiment of the disclosure.
Figure 3:
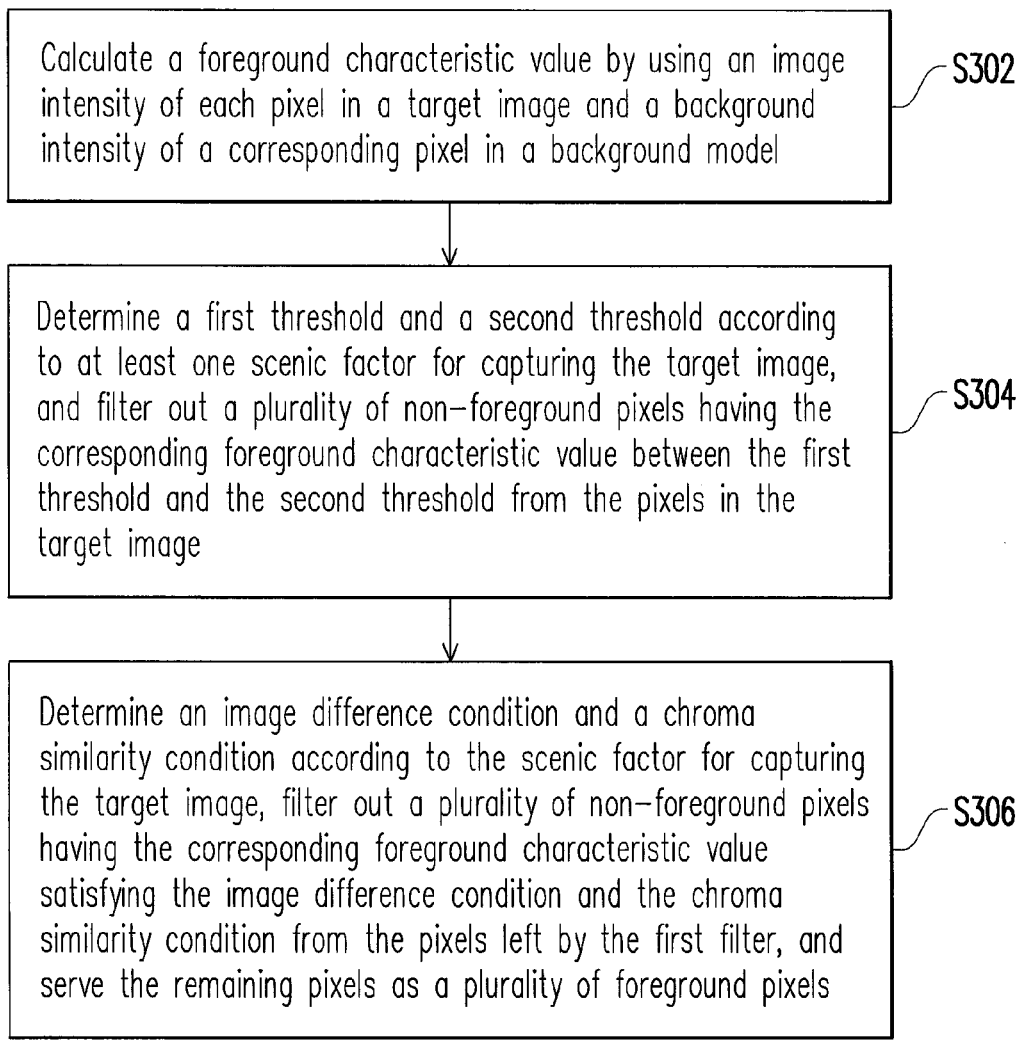
FIG. 3 is a flowchart of a foreground detection method according to an exemplary embodiment of the disclosure.

FIG. 2 is a block diagram of a foreground detection apparatus according to an exemplary embodiment of the disclosure. FIG. 3 is a flowchart of a foreground detection method according to an exemplary embodiment of the disclosure. Referring to both FIG. 2 and FIG. 3, the foreground detection apparatus 20 in the present exemplary embodiment may be the foreground detection apparatus 122 in foregoing exemplary embodiment. The foreground detection apparatus 20 includes a foreground characteristic value calculation module 22, a first filter 24, and a second filter 26. Below, the foreground detection method in the present exemplary embodiment will be described in detail with reference to the devices illustrated in FIG. 2.

First, the foreground characteristic value calculation module 22 calculates a foreground characteristic value by using the image intensity of each pixel in a target image and the background intensity of the corresponding pixel in a background model (step S302). The foreground characteristic value calculation module 22 may establish the background model by using a pre-recorded test video or an image input by the surveillance video camera such that foreground detection can be performed on subsequently captured surveillance images.

Figure 4:
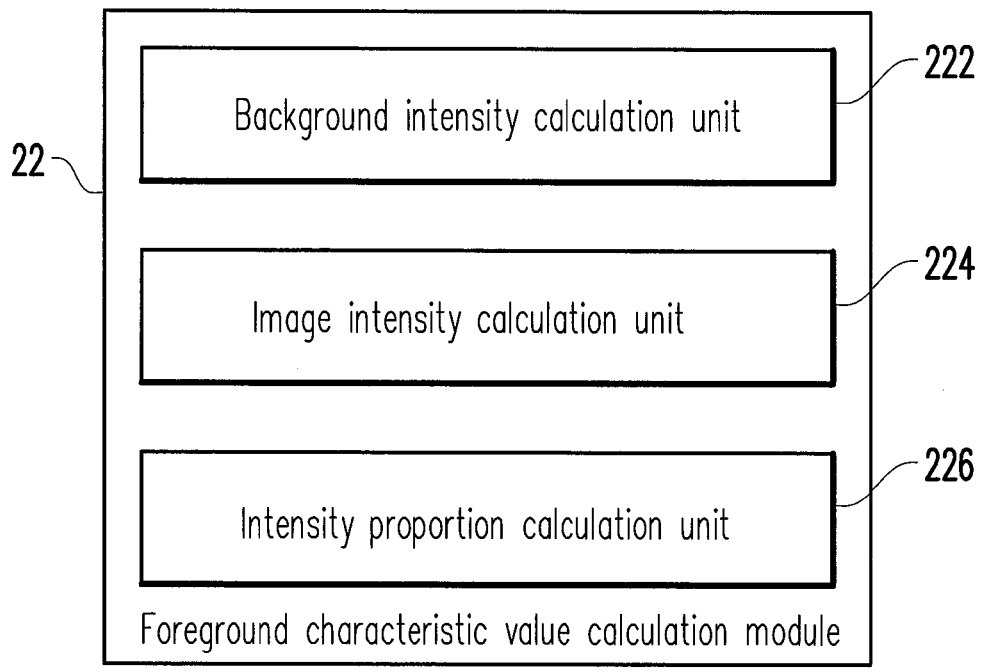
FIG. 4 is a block diagram of a foreground characteristic value calculation module according to an exemplary embodiment of the disclosure.

FIG. 4 is a block diagram of a foreground characteristic value calculation module according to an exemplary embodiment of the disclosure. Referring to FIG. 4, the foreground characteristic value calculation module 22 includes a background intensity calculation unit 222, an image intensity calculation unit 224, and an intensity proportion calculation unit 226. The background intensity calculation unit 222 receives a plurality of background images and calculates a background intensity of each pixel in the background images to establish a background model. The image intensity calculation unit 224 receives a target image and calculates an image intensity of each pixel in the target image. The intensity proportion calculation unit 226 calculates an intensity proportion of the image intensity of each pixel to the background intensity of the corresponding pixel in the background model and serves the intensity proportions as foreground characteristic values.

The present exemplary embodiment provides three different measurements regarding aforementioned background intensity and image intensity.

As to the first measurement, the background intensity calculation unit 222 directly serves the grayscale value of each pixel in a background image as the background intensity of the pixel, and the image intensity calculation unit 224 directly serves the grayscale value of each pixel in a target image as the image intensity of the pixel.

As to the second measurement, the background intensity calculation unit 222 calculates an average value of pixel values of each pixel in a background image in a plurality of color spaces (for example, R, G, B or Y, Cr, Cb) and serves the average value as the background intensity of the pixel, and the image intensity calculation unit 224 calculates an average value of pixel values of each pixel in a target image in a plurality of color spaces and serves the average value as the image intensity of the pixel.

As to the third measurement, the background intensity calculation unit 222 calculates a root sum of squares of pixel values of each pixel in a background image in a plurality of color spaces and serves the root sum of squares as the background intensity of the pixel, and the image intensity calculation unit 224 calculates a root sum of squares of pixel values of each pixel in a target image in a plurality of color spaces and serves the root sum of squares as the image intensity of the pixel.

For example, m (m is a positive integer) background images are used for establishing a background model, and an average pixel value $\bar{I}_i$ of each pixel in these background images in a plurality of color spaces is calculated:

$$\bar{I}_i = \frac{\sum_{i=1}^{m} I_i(t)}{m} \quad (1)$$

In foregoing expression (1), pixel information is indicated by the symbol $I=\{I_i|i=1, 2, 3\}$, wherein $I_i$ may be any information in the color space R, G, B or the color space Y, Cr, Cb.

For the convenience of description, the image intensity and the background intensity of each pixel in an input image are respectively indicated by the symbols |I| and |B|.

Taking the image intensity |I| as an example, foregoing three different definitions of image intensity can be respectively expressed as:

First measurement:

$$|I|=I_i \quad (2)$$

In foregoing expression (2), $I_i$ may be a grayscale value Y in the color space Y, Cr, Cb or any information in the color space R, G, B or Y, Cr, Cb.

Second measurement:

$$|I|=(I_1+I_2+I_3)/3 \quad (3)$$

In foregoing expression (3), $I_1$, $I_2$, and $I_3$ respectively represent pixel values in the color space R, G, B or Y, Cr, Cb.

Third measurement:

$$|I|=\sqrt{I_1^2+I_2^2+I_3^2} \quad (4)$$

In foregoing expression (4), $I_1$, $I_2$, and $I_3$ respectively represent pixel values in the color space R, G, B or Y, Cr, Cb.

Definitions of the background intensity |B| of each pixel in background images can be deduced from foregoing expressions. In the present exemplary embodiment, the intensity proportion r is calculated by using following formula after the image intensity |I| and the background intensity |B| are obtained:

$$r = \frac{|I|}{|B|} \quad (5)$$

In foregoing expression (5), |I|=|B| and r=1 if a target image is exactly the same as a background image.

Referring to FIG. 3 again, in the present exemplary embodiment, after the foreground characteristic values are obtained, the first filter 24 filters out most non-foreground pixels in the target image. Herein the first filter 24 determines a first threshold and a second threshold according to at least one scenic factor used by the surveillance video camera for capturing the target image and filters out a plurality of non-foreground pixels among the pixels in the target image, wherein the foreground characteristic values corresponding to these non-foreground pixels are between the first threshold and the second threshold (step S304). Aforementioned scenic factor may be the average traffic of pedestrians and vehicles, the size of an object appearing in the scene, or any other scenic variation. In addition, the first threshold and the second threshold may be two end values located at both sides of 1 and having their differences to 1 no more than a predetermined value, such as 0.95 and 1.05.

Eventually, the second filter 26 determines an image difference condition and a chroma similarity condition according to the scenic factor for capturing the target image, filters out non-foreground pixels which have the corresponding foreground characteristic value satisfying the image difference condition and the chroma similarity condition among the remaining pixels left by the first filter 24, and serves the remaining pixels as a plurality of foreground pixels (step S306).

Figure 5:
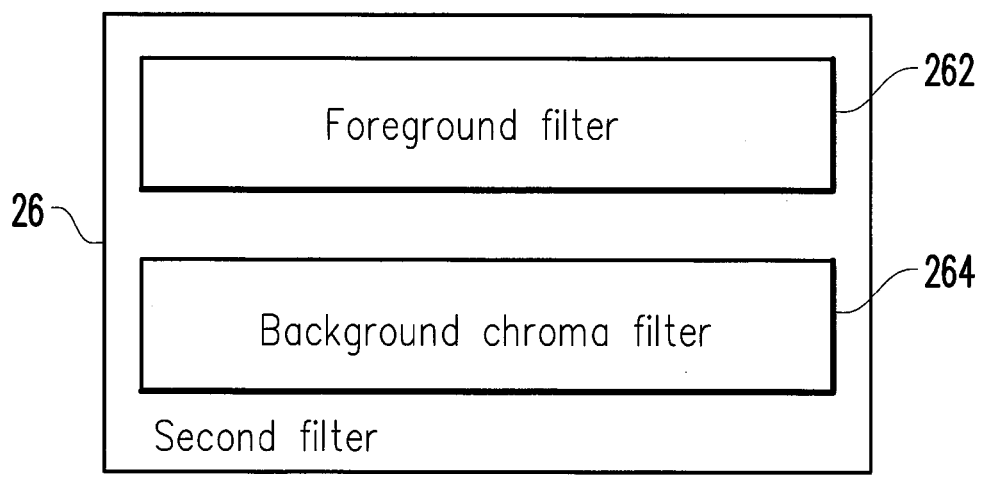
FIG. 5 is a block diagram of a second filter according to an exemplary embodiment of the disclosure.

FIG. 5 is a block diagram of a second filter according to an exemplary embodiment of the disclosure. Referring to FIG. 5, the second filter 26 includes a foreground filter 262 and a background chroma filter 264. The foreground filter 262 determines pixels having their corresponding foreground characteristic value greater than a third threshold of the image difference condition or smaller than a fourth threshold of the image difference condition among the remaining pixels left by the first filter 24 as foreground pixels. The background chroma filter 264 calculates a chroma difference of each pixel in the target image and determines pixels having their chroma differences greater than a fifth threshold of the chroma similarity condition or smaller than a sixth threshold of the chroma similarity condition among the remaining pixels as foreground pixels.

Figure 6:
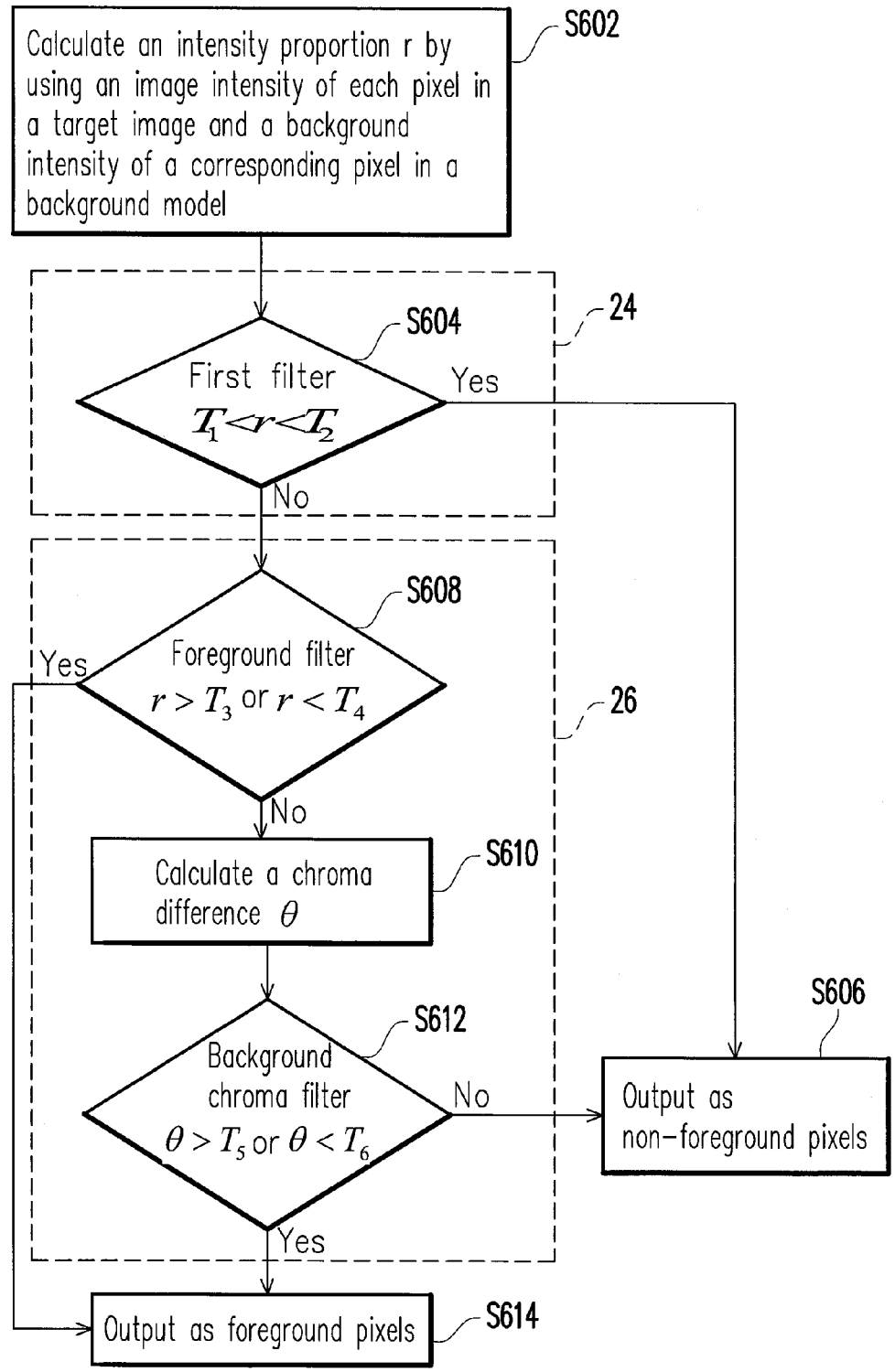
FIG. 6 is a flowchart of a foreground detection method according to an exemplary embodiment of the disclosure.

FIG. 6 is a flowchart of a foreground detection method according to an exemplary embodiment of the disclosure. Referring to FIG. 6, in the present exemplary embodiment, the pixels in an entire target image are indicated as $I_C=\{I_{c1}, I_{c2}, I_{c3}\}$, wherein C represents a superset, c1, c2, and c3 respectively represent a subset thereof, $I_{c1}$ represents a set of non-foreground pixels filtered out by the first filter, $I_{c2}$ represents a set of non-foreground pixels determined by the second filter, and $I_{c3}$ represents a set of pixels that are eventually determined to be foreground pixels. The first threshold $T_1$ and the second threshold $T_2$ are defined according to environmental particularity or past experience and satisfy following relational expression:

$$T_1<1<T_2 \quad (6)$$

Same as described in foregoing exemplary embodiment, in the foreground detection method provided by the present exemplary embodiment, the foreground characteristic value calculation module 22 first calculates a foreground characteristic value by using the image intensity of each pixel in a target image and the background intensity of a corresponding pixel in a background model (step S602). Regarding the intensity proportion r of a specific pixel in the target image calculated by the foreground characteristic value calculation module 22, the first filter 24 determines whether it is between the first threshold $T_1$ and the second threshold $T_2$ (step S604). Namely, the first filter 24 determines whether the intensity proportion r satisfies following relational expression (7):

$$T_1 \leq r \leq T_2 \quad (7)$$

If the intensity proportion r satisfies foregoing expression (7), the first filter 24 directly determines the pixel as a non-foreground pixel (step S606). Otherwise, if the intensity proportion r does not satisfy foregoing expression (7), the pixel enters the second filter 26. Because the intensity proportion r is calculated in foregoing steps, the operation load is very low and most non-foreground pixels $I_{c1}$ are filtered out by the first filter 24. Eventually, $\{I_{c2}, I_{c3}\}$ is left.

In the second filter 26, the non-foreground pixels $I_{c2}$ are filtered out by a foreground filter and a background chroma filter. The foreground filter defines thresholds (for example, $T_3$ and $T_4$) of the intensity proportion r according to scenic particularity or past experience. The range defined by the thresholds may or may not contain the range defined by foregoing expression (6), and $T_3>T_4$. The foreground filter compares the intensity proportion r with the thresholds $T_3$ and $T_4$ (step S608) to determine whether the intensity proportion r of any pixel in $\{I_{c2}, I_{c3}\}$ satisfies following expression:

$$r>T_3 \quad (8)$$

or $$r<T_4 \quad (9)$$

If the intensity proportion r satisfies foregoing expression, the pixel is directly determined and output as a foreground pixel (step S614) and considered an element of the set $I_{c3}$. Contrarily, whether the pixel is a foreground pixel or a non-foreground pixel cannot be determined therefore is further passed to the background chroma filter. Before entering the background chroma filter, a chroma difference θ between each pixel in the target image and the corresponding pixel in the background model has to be calculated (step S610). The chroma difference θ is defined as:

$$\theta(x, y) = \cos^{-1}\left(\frac{I \cdot B}{|I||B|}\right) \quad (10)$$

The background chroma filter can determine whether a pixel is a non-foreground pixel by directly using the chroma difference θ, or to simplify the calculation, using cos θ, which is not limited in the present exemplary embodiment. Herein two thresholds $T_5$ and $T_6$ of the chroma difference θ are defined according to scenic particularity or past experience. Regarding each pixel which does not satisfy the filtering conditions of the foreground filter, the background chroma filter compares the chroma difference θ thereof with the thresholds $T_5$ and $T_6$ (step S612) to determine whether the chroma difference θ satisfies following expression:

$$\theta > T_5 \quad (11)$$

or $$\theta < T_6 \quad (12)$$

If the chroma difference θ satisfies foregoing expression, the pixel is determined and output as a non-foreground pixel (step S606) and placed into the set $I_{c2}$. Contrarily, the pixel is determined and output as a foreground pixel (step S614) and considered as an element of the set $I_{c3}$.

Another exemplary embodiment of the foreground detection method described above is further described below, in which actual data is brought into foregoing expressions. First, a video recorded on a specific scene is input into a foreground detection apparatus, or a video camera is directly attached to the foreground detection apparatus for receiving a real-time image stream. Then, m initial images are collected to establish a background model (m is a positive integer), wherein an average pixel value of each pixel in different color spaces is calculated by using foregoing formula (1).

Next, the image intensity of each pixel in a target image is calculated by using foregoing formula (2), (3), or (4). After that, the intensity proportion r of the image intensity of each pixel in the target image to the background intensity of the corresponding pixel in the background model is calculated by using foregoing formula (5), wherein r=1 when the target image is a background image.

Figure 7A:
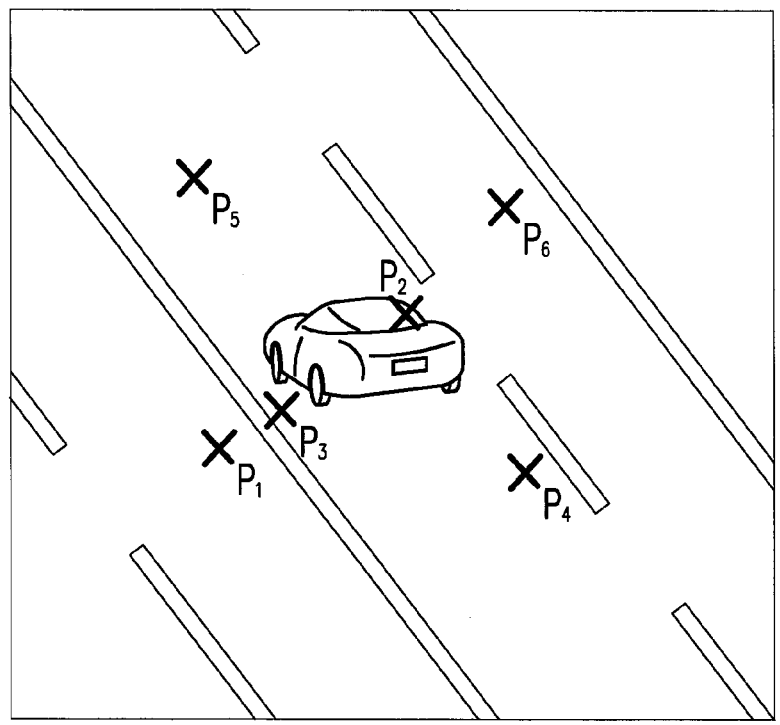
FIGS. 7A-7D illustrate an example of a foreground detection method according to an exemplary embodiment of the disclosure.

FIGS. 7A-7D illustrate an example of a foreground detection method according to an exemplary embodiment of the disclosure. In the present exemplary embodiment, 6 pixels evenly distributed around a foreground object 70 are taken as examples, and the positions of these pixels in an image are as illustrated in FIG. 7A. The intensity proportions r of these pixels are as shown in following table 1.

TABLE 1

| Pixel | P1 | P2 | P3 | P4 | P5 | P6 |
|---|---|---|---|---|---|---|
| r | 0.98 | 0.82 | 1.32 | 0.97 | 1.04 | 1.02 |

Then, two thresholds close to 1 are set in a first filter (for example, thresholds $T_1$=0.95 and $T_2$=1.05). Next, the intensity proportions r of the 6 pixels P1-P6 are filtered by the first filter (i.e., by foregoing expression (7)). If the intensity proportion r of a pixel satisfies foregoing expression (7), the pixel is determined to be a non-foreground pixel. Otherwise, the pixel is sent to a second filter to be further processed.

Figure 7B:
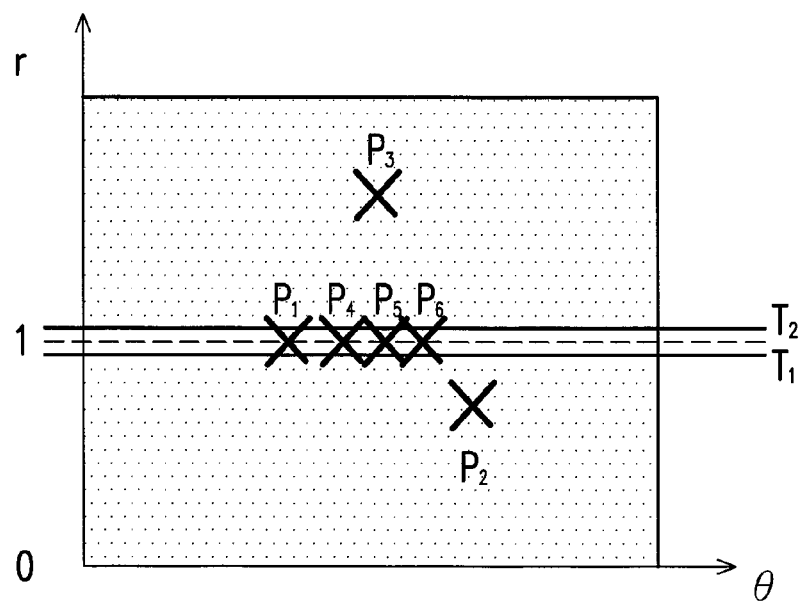

Through the processing of the first filter, as shown in FIG. 7B, the pixels P1, P4, P5, and P6 are determined to be non-foreground pixels, and the pixels P2 and P3 are sent to the second filter since they don't satisfy the expression (7). Thereby, the filtering mechanism of the first filter can filter out most pixels by calculating the intensity proportions r but not the chroma differences θ, so that the operation load is reduced.

Thereafter, two or more thresholds of intensity proportion r are set in a foreground filter. The range defined by these thresholds may contain the range defined by foregoing expression (6). In the present exemplary embodiment, two thresholds $T_3$ and $T_4$ are set. The settings of these thresholds may be affected by scenic factors. The scenic factors include different light distributions and intensities caused by different weather conditions or different scenic materials. For example, an outdoor road surface is not reflective, while an indoor marble floor is reflective, which result in different optimal settings of the thresholds. If an outdoor road and typical sunny weather are considered, the experiential thresholds are respectively $T_3$=1.2 and $T_4$=0.8. If a bright indoor site with stable illumination is considered, the experiential thresholds are respectively $T_3$=1.1 and $T_4$=0.7. If a dark indoor site with stable illumination is considered, the experiential thresholds are respectively $T_3$=1.3 and $T_4$=0.5.

Figure 7C:
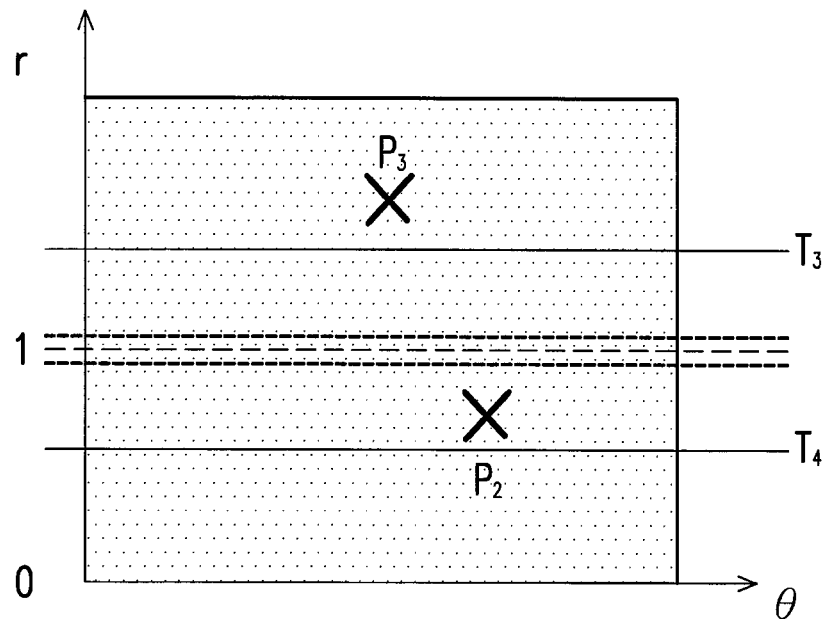

In the present exemplary embodiment, whether the pixels P2 and P3 left by the first filter are foreground pixels is determined according to their intensity proportions r through foregoing expressions (8) and (9). If one of the two expressions is satisfied, the pixels P2 and P3 are determined to be foreground pixels. Otherwise, these two pixels are further sent to a background chroma filter. As shown in FIG. 7C, the intensity proportion r of the pixel P3 is 1.32 and which is greater than $T_3$. Thus, the pixel P3 is determined to be a foreground pixel. Contrarily, because the intensity proportion r of the pixel P2 is 0.82 and which does not satisfy foregoing expression (8) or (9), the pixel P2 has to be sent to the background chroma filter to be further processed.

Figure 7D:
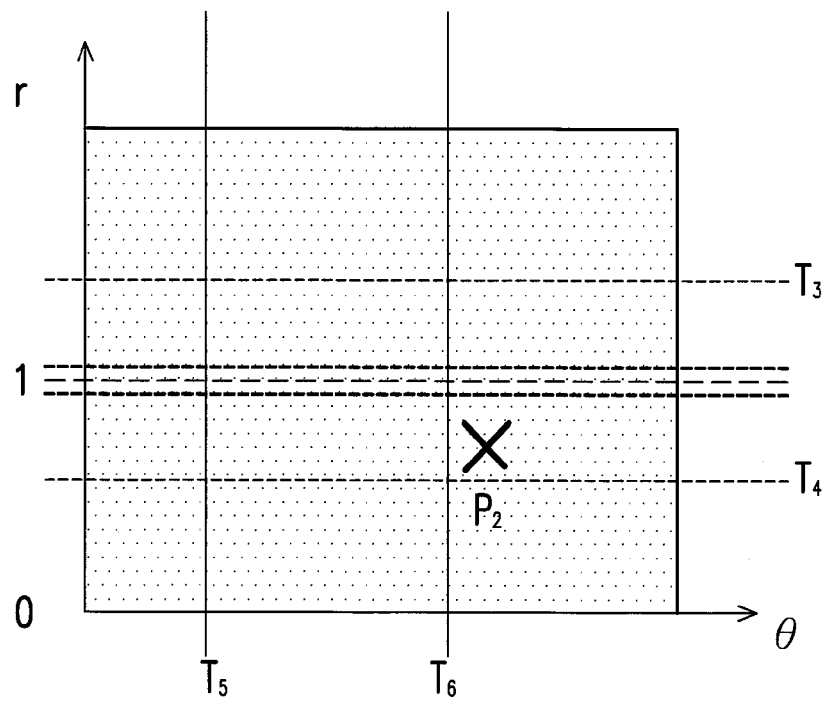

Finally, the chroma difference θ between the input pixel P2 and a background pixel at the same position is calculated to be 0.9 by using foregoing expression (10). As shown in FIG. 7D, the thresholds set by the background chroma filter are $T_5$=0.94 and $T_6$=1. Because the chroma difference 0.9 corresponding to the pixel P2 does not satisfy the expression (10), the pixel P2 is eventually determined to be a foreground pixel.

As described above, the disclosure provides an apparatus and a method for foreground detection, in which a pre-filter is adopted for roughly filtering out the similar parts of the foreground and the background in a surveillance image before foreground detection is performed, such that the operation load of a surveillance system for foreground detection can be greatly reduced. By adopting a foreground filter and a background chroma filter, foreground pixels and non-foreground pixels can be further distinguished. Thereby, foreground detection with high accuracy and low operation load is realized by the technique provided by the disclosure.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A foreground detection apparatus, comprising:
a foreground characteristic value calculation module, calculating a foreground characteristic value by using an image intensity of each of a plurality of pixels in a target image and a background intensity of a corresponding pixel in a background model;
a first filter, determining a first threshold and a second threshold according to at least one scenic factor for capturing the target image, and filtering out a plurality of non-foreground pixels having a corresponding foreground characteristic value between the first threshold and the second threshold from pixels in the target image; and
a second filter, determining an image difference condition and a chroma similarity condition according to the at least one scenic factor for capturing the target image, filtering out the plurality of non-foreground pixels having the corresponding foreground characteristic value satisfying the image difference condition and the chroma similarity condition from the pixels left by the first filter, and serving remaining pixels as a plurality of foreground pixels.

2. The foreground detection apparatus according to claim 1, wherein the foreground characteristic value calculation module comprises:
a background intensity calculation unit, receiving a plurality of background images, and calculating the background intensity of each pixel in the background images to establish the background model;
an image intensity calculation unit, receiving the target image, and calculating the image intensity of each of the pixels in the target image; and
an intensity proportion calculation unit, calculating an intensity proportion of the image intensity of each of the pixels to the background intensity of the corresponding pixel in the background model and serving the intensity proportion as the foreground characteristic value.

3. The foreground detection apparatus according to claim 2, wherein the background intensity calculation unit serves a grayscale value of each pixel in the background images as the background intensity of the pixel, and the image intensity calculation unit serves the grayscale value of each of the pixels in the target image as the image intensity of the pixel.

4. The foreground detection apparatus according to claim 2, wherein the background intensity calculation unit calculates an average value of pixel values of each pixel in the background images in a plurality of color spaces and serves the average value as the background intensity of the pixel, and the image intensity calculation unit calculates the average value of pixel values of each of the pixels in the target image in the color spaces and the average value of pixel values as the image intensity of the pixel.

5. The foreground detection apparatus according to claim 2, wherein the background intensity calculation unit calculates a root sum of squares of pixel values of each pixel in the background images in a plurality of color spaces and serves the root sum of squares as the background intensity of the pixel, and the image intensity calculation unit calculates the root sum of squares of pixel values of each of the pixels in the target image in the color spaces and serves the root sum of squares as the image intensity of the pixel.

6. The foreground detection apparatus according to claim 1, wherein the second filter comprises:
a foreground filter, determining pixels having the corresponding foreground characteristic value greater than a third threshold of the image difference condition or smaller than a fourth threshold of the image difference condition among the pixels left by the first filter to be foreground pixels; and
a background chroma filter, calculating a chroma difference between each of the pixels in the target image and the corresponding pixel in the background model, and determining the pixels having the chroma difference greater than a fifth threshold of the chroma similarity condition or smaller than a sixth threshold of the chroma similarity condition to be the foreground pixels.

7. The foreground detection apparatus according to claim 1, wherein the first threshold and the second threshold are two end values located at both sides of 1, and differences of the first threshold and the second threshold to 1 are not greater than a predetermined value.

8. A foreground detection method, adapted to an electronic apparatus for detecting a plurality of foreground pixels in a target image, the foreground detection method comprising:
calculating a foreground characteristic value by using an image intensity of each of a plurality of pixels in the target image and a background intensity of a corresponding pixel in a background model;
determining a first threshold and a second threshold according to at least one scenic factor for capturing the target image, and filtering out a plurality of non-foreground pixels having a corresponding foreground characteristic value between the first threshold and the second threshold from pixels in the target image; and
determining an image difference condition and a chroma similarity condition according to the scenic factor for capturing the target image, filtering out the plurality of non-foreground pixels having the corresponding foreground characteristic value satisfying the image difference condition and the chroma similarity condition from the pixels left by a first filter, and serving remaining pixels as the plurality of foreground pixels.

9. The foreground detection method according to claim 8, wherein the step of calculating the foreground characteristic value by using the image intensity of each of the pixels in the target image and the background intensity of the corresponding pixel in the background model comprises:
receiving a plurality of background images, and calculating the background intensity of each pixel in the background images to establish the background model;
receiving the target image, and calculating the image intensity of each of the pixels in the target image; and
calculating an intensity proportion of the image intensity of each of the pixels to the background intensity of the corresponding pixel in the background model and serving the intensity proportion as the foreground characteristic value.

10. The foreground detection method according to claim 9, wherein the step of calculating the background intensity of each pixel in the background images to establish the background model comprises:
calculating an average value or a root sum of squares of pixel values of each pixel in the background images in a plurality of color spaces and serving the average value or the root sum of squares as the image intensity of the pixel, or serving a grayscale value of each pixel in the background images as the image intensity of the pixel.

11. The foreground detection method according to claim 9, wherein the step of calculating the image intensity of each of the pixels in the target image comprises:
calculating an average value or a root sum of squares of pixel values of each of the pixels in the target image in a plurality of color spaces and serving the average value or the root sum of squares as the image intensity of the pixel, or serving a grayscale value of each of the pixels in the target image as the image intensity of the pixel.

12. The foreground detection method according to claim 9, wherein the step of filtering out non-foreground pixels having the corresponding foreground characteristic value satisfying the image difference condition and the chroma similarity condition from the pixels left by the first filter and serving remaining pixels as foreground pixels comprises:

determining pixels having the corresponding foreground characteristic value greater than a third threshold of the image difference condition or smaller than a fourth threshold of the image difference condition among the pixels left by the first filter to be the foreground pixels; and calculating a chroma difference between each of the pixels in the target image and the corresponding pixel in the background model, and determining the pixels having the chroma differences greater than a fifth threshold of the chroma similarity condition or smaller than a sixth threshold of the chroma similarity condition to be the foreground pixels.

13. The foreground detection method according to claim 9, wherein the first threshold and the second threshold are two end values located at both sides of 1, and differences of the first threshold and the second threshold to 1 are not greater than a predetermined value.

\* \* \* \* \*